(No Model.)
J. K. PROCTOR.
SLEEVE JOURNAL FOR SHAFTS.
No. 288,489. Patented Nov. 13, 1883.
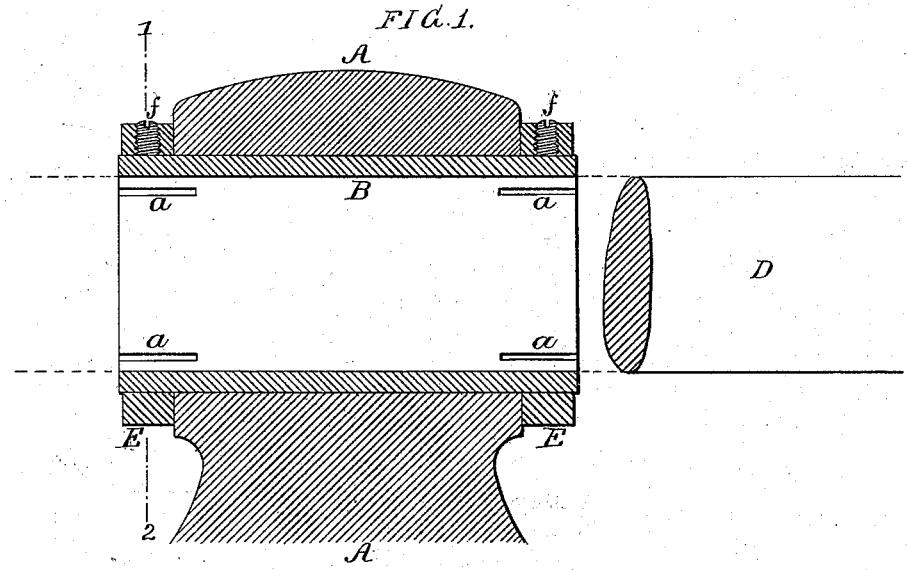
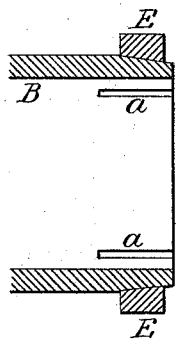
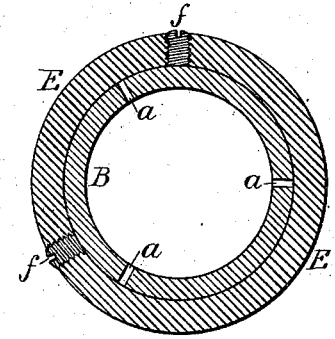
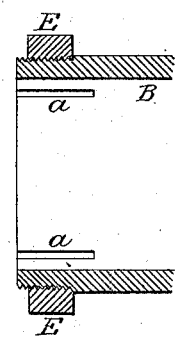
WITNESSES:
Harry L. Ashenfelter.
James F. Tobin
INVENTOR:
Josiah K. Proctor
by his Attys
Howson & Sons

UNITED STATES PATENT OFFICE.

JOSIAH K. PROCTOR, OF PHILADELPHIA, PENNSYLVANIA, ASSIGNOR TO THE JAMES SMITH WOOLEN MACHINERY COMPANY, OF SAME PLACE.

SLEEVE-JOURNAL FOR SHAFTS.

SPECIFICATION forming part of Letters Patent No. 288,489, dated November 13, 1883.

Application filed September 15, 1883. (No model.)

*To all whom it may concern:*

Be it known that I, JOSIAH K. PROCTOR, a citizen of the United States, and a resident of Philadelphia, Pennsylvania, have invented an Improved Sleeve-Journal for Shafts, of which the following is a specification.

My invention consists, mainly, of a slotted sleeve of hard metal, constructed for application to a shaft, so as to form a durable journal therefor, substantially as described hereinafter.

In the accompanying drawings, Figure 1 is a longitudinal section of my improved sleeve-journal for shafts; Fig. 2, a transverse section on the line 1 2, Fig. 1; and Figs. 3 and 4, views of modified forms of the journal.

A is part of a journal-box of any approved construction. It may, for instance, be part of a pedestal or part of a hanger. A sleeve, B, consisting of a tube of case-hardened iron or hardened steel, forms the journal for this bearing, and is secured to the shaft D (shown partly by dotted lines in Fig. 1) in the following manner: Before the sleeve is hardened incisions or slots $a$, preferably three, are made in each end of the sleeve, to which rings E are fitted, one at each end, and through each ring pass two set-screws, $f$, these screws bearing against two of the segments formed on the end of the sleeve by the slots, as shown in Fig. 2, so that on tightening the screws the slotted ends of the sleeve will tightly embrace the shaft, and the rings will be at the same time secured to the sleeve, and may, when required, become the collars by which the shaft is retained in its proper position longitudinally. One ring at one slotted end only of the sleeve will suffice to secure the same to the shaft, but I prefer the application of two rings, one to each end of the sleeve, as shown.

One advantage of my invention is that a perfectly true sleeve of hardened steel or case-hardened iron can be obtained when made in the manner shown—that is, without any protuberances to disturb its uniformity in thickness and diameter throughout—the process of hardening having no tendency to throw the sleeve out of truth, whereas it is next to impossible to make a case-hardened sleeve or one of hardened steel perfectly true if it varies materially in thickness at any point—if, for instance, a collar forms part of the sleeve. A slight taper may be imparted to each end of the sleeve, however, without materially affecting the hardening of the same; hence tapering rings, plain, as shown in Fig. 3, or threaded, as shown in Fig. 4, may be used in place of the rings E and set-screws $f$ for contracting the slotted ends of the sleeve.

I claim as my invention—

1. The combination, with a bearing and shaft, of a hard-metal sleeve slotted at one or both ends, a ring or rings, E, and means, substantially as described, whereby the said ring or rings are secured to the sleeve, and the latter to the shaft, substantially as specified.

2. The combination of a shaft, a hard-metal sleeve slotted at one or both ends, and a ring or rings, E, applied to the slotted end or ends of the sleeve, and having set-screws bearing upon the segments of the sleeve, as set forth.

In testimony whereof I have signed my name to this specification in the presence of two subscribing witnesses.

JOSIAH K. PROCTOR.

Witnesses:
HARRY L. ASHENFELTER,
HARRY SMITH.